L. W. CENTER.
Milk-Cooler.
No. 209,548. Patented Nov. 5, 1878.
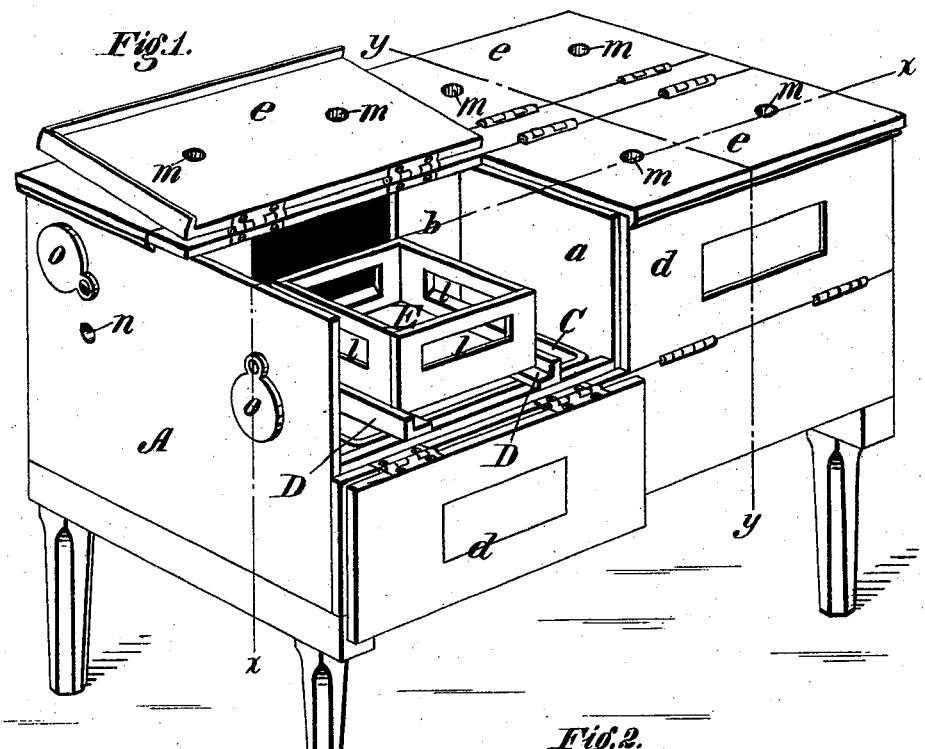
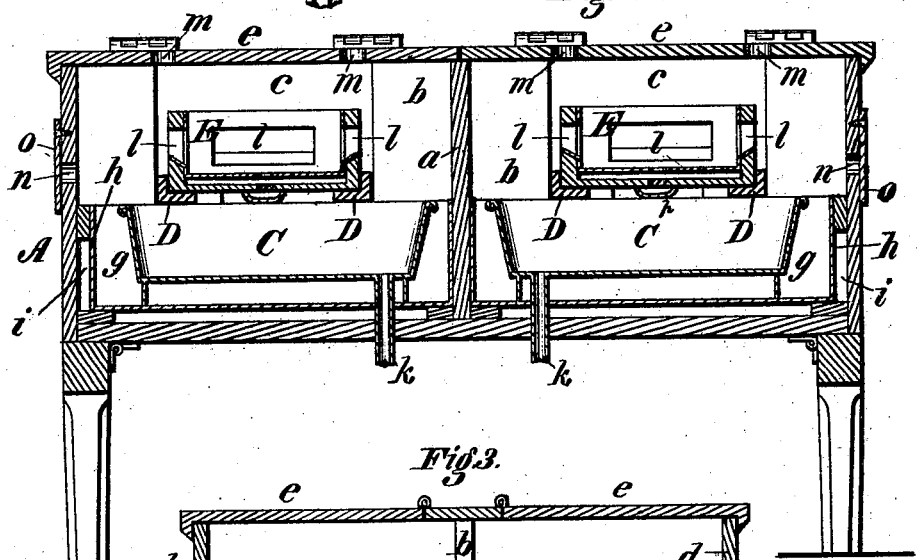
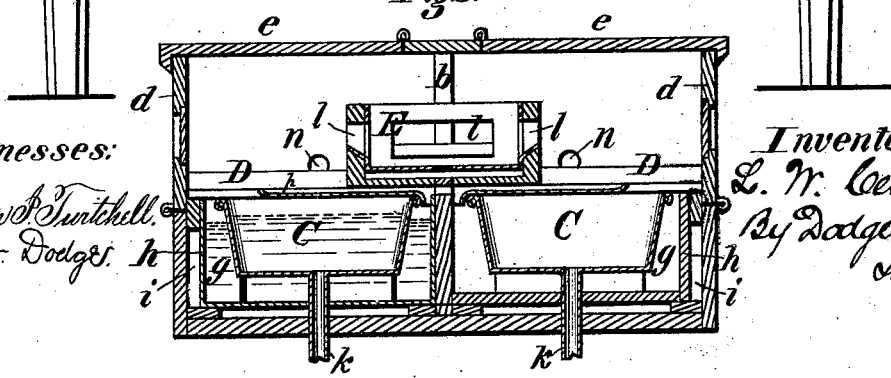
Witnesses:
Inventor:
L. W. Center
By Dodge & Son
Atty

UNITED STATES PATENT OFFICE.

LEWIS W. CENTER, OF POTSDAM, NEW YORK.

IMPROVEMENT IN MILK-COOLERS.

Specification forming part of Letters Patent No. 209,548, dated November 5, 1878; application filed July 25, 1878.

*To all whom it may concern:*

Be it known that I, LEWIS W. CENTER, of Potsdam, in the county of St. Lawrence and State of New York, have invented certain Improvements in Milk-Coolers, of which the following is a specification:

My invention consists in an apparatus for cooling or refrigerating milk, constructed in the peculiar manner hereinafter described, whereby the handling of the milk and the ice is greatly facilitated and the operator enabled to maintain the temperature at a low point, while at the same time free access is given to the different pans or vessels, the improvements consisting mainly in arranging the apparatus with pairs of compartments and supporting-rails.

Referring to the accompanying drawings, Figure 1 represents a perspective view of my cooler; Fig. 2, a cross-section of the same on the line $x\,x$; Fig. 3, a section on the line $y\,y$.

A represents a rectangular wooden case or body, divided into four compartments by means of transverse vertical partitions $a\,b$, extending at right angles to each other, the former being solid and the latter being provided with two openings, $c$, forming a communication between opposite sides.

The case is provided with four side doors, $d$, extending downward about half the depth of the body and opening into the respective compartments, and with four top doors, $e$, also opening into the respective compartments, the top doors or lids being provided with lips to engage and hold the side doors, as shown in the drawings.

Each of the compartments $g$ is provided with an internal pan or lining, $h$, of sheet metal or other suitable material, to form a water-receptacle. The lining $h$ is arranged at a distance from the outside body, and the space $i$ around it either left empty or filled with a non-conducting material, the object being to prevent the water from being heated through the case or body.

Within each chamber there is placed a shallow rectangular pan or vessel, C, to receive and hold the milk, the vessel being sustained above the bottom of the chamber by means of legs or other supports, and being provided at or near one end with a discharge-pipe, $k$, extending downward through the bottom of the chamber and case, a tight joint being formed between this pipe and the bottom of the water-chamber to prevent the water from escaping. In each end of the body A, I place two horizontal transverse rails, D, extending through the same from side to side, as shown, each pair of rails extending through one of the corresponding openings $c$ and across the two pans in the communicating chambers or compartments. On each pair of rails I mount an ice box or receptacle, E, preferably made of wood lined with sheet metal, and provided in the sides with openings $l$, to permit the free circulation of air through and around them. These boxes will be provided in the bottom with a water-outlet, as shown, and a conductor, $p$, also provided, to deliver the water into the water-space outside of the milk-pans; or a water-space may be left between the metallic lining and the bottom of the ice-box, the water being permitted to accumulate in the space, and being discharged from time to time through an opening in the bottom.

In the event of the pipe or conductor being used it may be swiveled or jointed in any suitable manner to admit of the ice-box being moved laterally without breaking the connection; or a trough may be extended transversely through the body beneath each box to deliver the water at the side, either into the space around the pan or through a special pipe from the body.

Each box, being mounted on rails, as described, may be moved thereon from side to side, and thus placed in either one of the two chambers, or in an intermediate position through the openings $c$, in which case it will extend over the adjacent sides of both pans.

By arranging the ice-box upon the rails as described, it is moved to and fro with ease and readiness, although containing a large amount of ice, so that access may be had to either pan at will, it being only necessary when access is to be had to one pan to move the ice-box backward over the adjoining pan. The movement of the ice-box to the side of the case also permits the more ready introduction of the ice.

The rails upon which the ice-box slides should be divided at the center and made capable of a ready removal, so that when the ice-box is in one compartment the rails may be readily removed from the adjacent compartment, so as to give free access to the pan therein. Each box should also be provided with wheels or casters, to admit of its being moved with ease when containing a large abount of ice.

In order to secure the proper circulation of air through the case, it is provided in the top with openings $m$ and in the end with openings $n$, pivoted covers $o$ being provided for the purpose of closing the latter openings when desired.

It will be noted that when either compartment is open the ice-box, filling to a great extent the opening $c$, prevents the loss of cold air from the adjoining compartment.

In using the apparatus, water is placed in each of the compartments around the pan therein, the milk, placed within the pan, and ice placed within the boxes E. The ice, located above the milk, serves to cool the air contained within the chamber, cooling the milk directly from above, and to reduce the water around the pan to a low degree of temperature.

Having thus described my invention, what I claim is—

1. The milk-cooler consisting of the body A, provided with the partitions $a$ $b$, doors $d$ $e$, water-receptacles $h$, pans C, and the ice-boxes E, mounted and arranged to slide upon rails, as shown and described.

2. In a milk-cooler, the combination of two communicating compartments, $g$, each provided with a water-vessel and a milk-pan therein, with rails D, extending into the two compartments, and an ice-box, E, mounted upon said rails and capable of being moved into either compartment or into an intermediate position, at will.

LEWIS W. CENTER.

Witnesses:
 JOHN S. LOUCKS,
 HALLEM L. IVES.